(12) United States Patent
Takaki et al.

(10) Patent No.: US 6,747,083 B2
(45) Date of Patent: Jun. 8, 2004

(54) PROCESS FOR PRODUCING RUBBER LATEX CONTAINING WATER IN PARTICLE

(75) Inventors: Akira Takaki, Kobe (JP); Toshio Mizuta, Takasago (JP); Tomomichi Hashimoto, Takasago (JP); Toshiyuki Mori, Akashi (JP); Mitsuo Kakutani, Takasago (JP)

(73) Assignee: Kaneka Corporation, Osaka (JP)

( * ) Notice: Subject to any disclaimer, the term of this patent is extended or adjusted under 35 U.S.C. 154(b) by 149 days.

(21) Appl. No.: 09/926,830

(22) PCT Filed: May 9, 2001

(86) PCT No.: PCT/JP01/03860
§ 371 (c)(1), (2), (4) Date: Dec. 27, 2001

(87) PCT Pub. No.: WO01/85817
PCT Pub. Date: Nov. 15, 2001

(65) Prior Publication Data
US 2002/0177634 A1 Nov. 28, 2002

(30) Foreign Application Priority Data
May 12, 2000 (JP) .................... 2000-140562

(51) Int. Cl.$^7$ .................... C08L 13/02
(52) U.S. Cl. .................... 524/458; 524/832; 525/70; 525/80
(58) Field of Search .................... 524/832, 458; 525/70, 80

(56) References Cited

FOREIGN PATENT DOCUMENTS

| JP | 5-262945 | | 10/1993 |
|---|---|---|---|
| JP | 7-70255 | | 3/1995 |
| JP | 07-070255 | * | 3/1995 |
| JP | 8-325432 | | 12/1996 |
| JP | 9-111097 | | 4/1997 |

* cited by examiner

Primary Examiner—William Cheung
(74) Attorney, Agent, or Firm—Armstrong, Kratz, Quintos, Hanson & Brooks, LLP

(57) ABSTRACT

There is provided a rubber latex for an excellent impact modifier used for a thermoplastic resin. A rubber latex containing water in particles obtained by seed polymerization with seed polymers which are highly hydrophilic and sufficiently swellable into a rubber monomer is used as an impact modifier for a thermoplastic resin.

9 Claims, No Drawings

PROCESS FOR PRODUCING RUBBER LATEX CONTAINING WATER IN PARTICLE

TECHNICAL FIELD

The present invention relates to a rubber latex containing water in particles, a process for preparing the same and an impact modifier.

BACKGROUND ART

In order to improve impact resistance of a thermoplastic resin, it is known to mix a copolymer containing a diene-based rubber or an acrylate-based rubber. For example, there is a process disclosed in Japanese Examined Patent Publication No. 39-19035. Rubber components are resourcefully studied for achieving higher impact resistance. Suggestions are, for example, a method of increasing a particle size of a rubber component (Japanese Examined Patent Publication No. 42-22541/1967) and a method of lowering Tg of a rubber component (Japanese Unexamined Patent Publication Nos. 2-1763/1990 and 8-100095/1996).

In these methods, however, there are problems that it is difficult to meet the demands for significant improvement of impact resistance, and that cost for raw materials increases drastically.

For improving impact resistance of thermoplastic resins such as a vinyl chloride resin, what plays important roles are stress concentration of a molded article and formation and expansion of voids in a rubber by mixing the above copolymers (impact modifier). For obtaining the stress concentration, it is essential to introduce a rubber component having elastic modulus significantly lower than that of a thermoplastic resin. Formation and expansion of voids in a rubber are expected to contribute intensely to growth of shearing yield particularly having large energy absorption in an impact test, and to lead to improvement in impact resistance of a thermoplastic resin which contains a rubber.

Therefore, how to promote formation and expansion of voids in a rubber component is extremely important at impact to a molded article, i.e. under stress. It is considered that formation and expansion of voids in the rubber component is significantly influenced by cross-linking state of the rubber. Also, when a rubber component is previously made hollow, there is possibility that voids are easily propagated under stress.

Then, various investigations were made with respect to a novel process for preparing a rubber latex used for an impact modifier which remarkably improves impact resistance of a thermoplastic resin. As a result, it has been found that a rubber latex having water in particles, obtained by seed polymerization with a small amount of seedpolymers which is highly hydrophilic and swellable to rubber monomers, is the most suitable.

DISCLOSURE OF INVENTION

Namely, the present invention relates to a rubber latex containing water in particles, which is obtained by seed polymerization with seed polymers which are hydrophilic and swellable into a rubber monomer.

In the above rubber latex, 0.1 to 25 parts by weight of the seed polymer is preferably used based on 100 parts by weight of a latex rubber.

In the above rubber latex, it is preferable that an extraction ratio of a water-soluble substance to water is 10 to 100% after adding water to dry seed polymers in twentyfold amount and stirring for an hour, and that a swelling volume ratio, measured from the ratio of a latex particle size to an original particle size, is 3 to 20 times, said latex particle size being the value after adding a rubber latex to the seed polymer latex in an amount of 50 times the seed polymer and stirring for an hour.

More preferably, the extraction ratio is 50 to 100% and the swelling volume ratio is 5 to 15 times.

The present invention also relates to a process for preparing a rubber latex containing water in particles, which is obtained by seed polymerization with seed polymers which are hydrophilic and swellable into a rubber monomer.

In the process for preparing a rubber latex, it is preferable that the seed polymerization is performed by adding monomers continuously, an extraction ratio of a water-soluble substance to water is 10 to 100% after adding water to dry seed polymers in twentyfold amount and stirring for an hour, and that a swelling volume ratio, measured from the ratio of a latex particle size to an original particle size, is 3 to 20 times, the latex particle size being the value after adding a rubber latex to the seed polymer latex in an amount of 50 times the seed polymer and stirring for an hour.

More preferably, the extraction ratio is 50 to 100% and the swelling volume ratio is 5 to 15 times.

In the above process for preparing a rubber latex, the seed polymer is preferably synthesized by emulsion polymerization with a water-soluble initiator.

The present invention also relates to an impact modifier for a thermoplastic resin, which is obtained by graft copolymerization with the above rubber latex.

BEST MODE FOR CARRYING OUT THE INVENTION

There are various methods for preparing hollow rubber particle in the fields of coating materials and weight saving for plastics. For example, the following methods are well known ("Gosei Latex no Oyo (application of synthetic latex)", Takaaki Sugimura et al., p 285):

(a) a method wherein a W/O/W emulsion is prepared, and a monomer in the O layer is polymerized (O: lipophilic, W: hydrophilic);

(b) a method wherein core-shell particles having swellable core is swelled at temperature of at least glass transition temperature of shell layer to make hollow;

(c) a method by using two-step polymerization of polymers having different solubility parameter;

(d) a method wherein a polymerizable monomer containing a cross linkable monomer and a hydrophilic monomer, and an oil substance are finely dispersed in water to make an O/W emulsion, and the monomer is polymerized to remove the oily substance; and (e) a method by using migration of a carboxylic acid copolymerized into a particle under acidic or alkaline condition in the particle.

The process for preparing a rubber latex containing water in particles of the present invention differs from these methods. It is the process for preparing a latex having voids filled with water through the polymerization progress by seed polymerization with a small amount of seed polymers which are highly hydrophilic and swellable to rubber monomer to be prepared. It is possible to confirm the state that water is contained in rubber particles and voids are present in a latex state by embedding a rubber latex in an epoxy resin and the like, and then according to TEM observation by dying it with ruthenium tetraoxide and the like. Further, the void ratio can be calculated by exactly measuring the particle size of a rubber latex by Microtrac UPA (Ultrafine Particle Analyzer) and the like, and then measuring light scattering strength of the same rubber latex.

High impact resistance can be obtained by preparing a rubber-containing graft copolymer by graft polymerizing a monomer or the like, which generates a polymer compatible with thermoplastic resins, onto the rubber latex containing water in particles obtained in the present invention, and then mixing it with a thermoplastic resin and molding the same.

The seed polymer used in the present invention can be prepared by usual emulsion polymerization, but the method of synthesis is not particularly limited. The seed polymer is not limited to a rubber component such as butyl acrylate rubber or butadiene rubber, but there is no problem when a hard polymer such as a butyl acrylate-styrene copolymer or a styrene-acrylonitrile copolymer is used. However, they are required to be highly swellable to the monomer generated in the following step and have strong hydrophilic property for incorporating water into the particles.

As a method for improving swelling property of the seed polymer to a rubber monomer, it is important to make the polarity suitable for the rubber monomer at first. Then it is effective to lower the molecular weight of the seed polymer to a notable degree by using a chain transfer agent, selecting high polymerization temperature and adding a large amount of initiator.

Effective methods for imparting hydrophilic property to the seed polymer include (a) a method for using a hydrophilic monomer for the seed polymer, (b) a method for introducing a highly hydrophilic initiator end group and (c) a method for lowering the molecular weight of the seed polymer by using a chain transfer agent, particularly in a large amount, selecting high polymerization temperature and adding a large amount of initiator.

Examples of the monomer used for the seed polymer of the present invention include the above hydrophilic monomers, alkyl acrylates, alkyl methacrylates and the like. Specifically, there are methyl acrylate, methyl methacrylate and the like. Monomers having low softening temperature are preferable from the viewpoint of improving swelling property into a rubber monomer.

The initiator for the seed polymer preferably includes, but not particularly limited to, highly hydrophilic water-soluble initiators. Typical examples of the highly hydrophilic water-soluble initiators are potassium persulfate and ammonium persulfate. The amount of the initiator is preferably 0.1 to 1 part by weight, and more preferably 0.3 to 0.7 part by weight based on 100 parts by weight of the monomer used for the seed polymer.

It is preferable to synthesize the seed polymer of the present invention according to emulsion polymerization by using the above water-soluble initiator from the viewpoint of imparting hydrophilic property. The polymerization temperature is preferably 40 to 80° C., and more preferably 50 to 70° C. When the polymerization temperature is higher than 80° C., there is a tendency that polymerization heat is intensively generated so that polymerization temperature is difficult to control. When it is lower than 40° C., polymerization tends to be difficult. The lower limit of the polymerization temperature is 40° C., preferably 50° C., while the upper limit of the polymerization temperature 80° C., preferably 75° C.

Examples of the chain transfer agent include, but are not limited to, mercaptans such as n-dodecyl mercaptan and t-dodecyl mercaptan.

The weight average molecular weight of the seed polymer is preferably 500 to 4,000. When it is less than 500, synthesis tends to be difficult. When it is more than 4,000, swelling property tends to decrease. The lower limit of the weight average molecular weight is 500, preferably 800. The upper limit of the weight average molecular weight is 4,000, preferably 2,000.

The average particle size of the seed polymer is preferably 0.040 to 0.1 μm. When it is smaller than 0.040 μm, synthesis thereof tends to be difficult. When it is larger than 0.1 μm, swelling property tends to decrease. The lower limit of the average particle size is 0.040 μm, preferably 0.045 μm. The upper limit of the average particle size is 0.1 μm, preferably 0.08 μm.

The standard index for the hydrophilic property of the seed polymer of the present invention is the extraction ratio of a water-soluble substance to water after adding water to dry seed polymers in twentyfold amount and stirring for an hour. Preferably, the extraction ratio of a water-soluble substance to water is 10 to 100%. When it is less than 10%, there is a tendency that void ratio of the rubber latex does not increase. The lower limit of the extraction ratio is 10%, and more preferably 50%.

The standard index for the swelling property of the seed polymer to the rubber monomer in the present invention is the swelling volume ratio measured from the ratio of a latex particle size to an original particle size, said latex particle size being the value after adding a rubber latex to the seed polymer latex in an amount of 50 times the seed polymer and stirring for an hour. Preferably, the swelling volume ratio is 3 to 20 times in the present invention. When it is less than 3 times or more than 20 times, there is a tendency that void ratio of the rubber latex does not increase. The upper limit of the swelling volume is 20 times, preferably 15 times, while the lower limit of the swelling volume is 3 times, preferably 5 times.

The amount of the seed polymer in the rubber latex is preferably 0.1 to 25 parts by weight based on 100 parts by weight of the latex rubber. When it is less than 0.1 part by weight, there is a tendency that impact strength of the molded article is not improved due to collapse of the graft copolymer at molding. When it is more than 25 parts by weight, there is a tendency that impact strength of the molded article is not improved because the rubber is cured to lower stress concentration ratio. The upper limit of the seed polymer amount is 25 parts by weight, and more preferably 10 parts by weight, while the lower limit of the seed polymer amount is 0.1 part by weight, and more preferably 1 part by weight.

Seed polymerization process and conditions are shown below.

Any rubber elastomer can be used for the rubber component for the rubber latex of the present invention as long as glass transition temperature thereof is at most 0° C. The upper limit of the glass transition temperature is 0° C., more preferably −20° C., because elastic modulus thereof is required to be significantly lower than that of a matrix resin.

Examples of the rubber satisfying these conditions are a diene rubber, an acrylic rubber, a silicon rubber and an olefin rubber, but the rubber is not limited thereto. Specifically, examples of the diene rubber are a butadiene rubber, a styrene-butadiene rubber, an acrylonitrile-butadiene rubber and the like. Examples of the acrylic rubber are a butyl acrylate rubber, a butadiene-butyl acrylate rubber, a 2-ethylhexyl acrylate-butyl acrylate rubber and the like. Examples of the silicon rubber are a polydimethyl siloxane rubber and the like. Examples of the olefin rubber are an ethylene-propylene rubber, an ethylene-propylene-diene rubber and the like.

The cross-linking agent used for rubber polymerization prevents the rubber particle from collapsing into smaller pieces at molding. When an amount thereof is too much, it does not collapse at all in molding, but voids are not easily expanded at impact (under stress) and there is no remarkable increase of the impact strength of the final molded article. Examples of the cross-linkable monomer are allyl methacrylate, divinylbenzene, diallyl phthalate, polyethylene glycol dimethacrylate, 1,3-butylene glycol dimethacrylate, ethylene glycol dimethacrylate and the like. These may be used alone or in combination of two or more. The amount of the cross-linking agent is 0 to 5 parts by weight, preferably 0.1 to 3 parts by weight based on 100 parts by weight of the rubber component monomer.

The rubber latex of the present invention is preferably prepared according to seed polymerization in which seed polymers is used and monomers are continuously added, from the viewpoint that polymerization heat can be constant so that polymerization temperature is easily controlled. Herein, the continuous addition refers to adding monomers continuously at a constant flow rate.

The preparation condition of the rubber latex is polymerization temperature of 30 to 60° C., preferably 40 to 55° C. When the polymerization temperature is lower than 30° C., there is a tendency that polymerization conversion ratio does not rise easily. When it is higher than 60° C., impact strength of the molded article tends to decrease due to collapse of the rubber at molding.

The average void ratio of the rubber is preferably 3 to 90%. When the average void ratio is less than 3%, improving effect on impact strength tends to be small. When the average void ratio is more than 90%, improving effect on impact strength tends to be small due to collapse of the rubber particles at molding. The lower limit of the average void ratio is 3%, more preferably 20%. The upper limit of the average void ratio is 90%, more preferably 80%.

The average particle size of the seed rubber is preferably 0.1 to 0.3 $\mu$m. When it is smaller than 0.1 $\mu$m, synthesis tends to be difficult. When it is larger than 0.3 $\mu$m, there is a tendency that void ratio of the rubber latex is not increased. The lower limit of the average particle size is 0.1 $\mu$m, more preferably 0.12 $\mu$m. The upper limit of the average particle size is 0.3 $\mu$m, more preferably 0.25 $\mu$m.

The graft copolymer which acts as an impact modifier in the present invention can be prepared by polymerization of monomers onto the rubber particles as they are, or a larger graft polymer may be obtained by enhancement methods such as acid enhancement and salt enhancement of a rubber particle.

The graft copolymer which acts as an impact modifier in the present invention is obtained by polymerizing 10 to 70 parts by weight, preferably 12 to 40 parts by weight of a monomer in the presence of 30 to 90 parts by weight, preferably 60 to 88 parts by weight of a rubber latex (solid content). When the rubber component is less than 30 parts by weight, the improving effect for impact resistance is small. When it is more than 90 parts by weight, particles of the impact modifier collapse at molding of the mixed composition, and the improving effect for impact resistance of the molded article becomes small.

As the monomer polymerized in the presence of the rubber particles, it is preferable to use a monomer or a monomer mixture containing at least one selected from the group consisting of a (meth)acrylate, an aromatic vinyl compound, a vinyl cyamide compound and vinyl chloride in an amount of at least 60% by weight.

Examples of the (meth)acrylate are methyl methacrylate, ethyl methacrylate, butyl methacrylate and 2-ethylhexyl methacrylate; methyl acrylate, ethyl acrylate, butyl acrylate and 2-ethylhexyl arylate; and the like. Examples of the aromatic vinyl compound are styrene, $\alpha$-methylstyrene, chlorstyrene and the like. Examples of the vinyl cyanide compound are acrylonitrile, methacrylonitrile and the like.

Examples of the thermoplastic resins for which the impact modifier of the present invention is used include a vinyl chloride resin, an acrylic resin, a styrene resin, a carbonate resin, an amide resin, an ester resin, an olefin resin and the like. Examples of the vinyl chloride resin are poly(vinyl chloride), a copolymer of at least 50% by weight of vinyl chloride with monomers such as vinyl acetate and ethylene which are copolymerizable with vinyl chloride, and a chlorinated vinyl chloride resin and the like. Examples of the acrylic resin are poly(methyl methacrylate) and a copolymer of at least 50% by weight of methyl methacrylate with monomers such as methyl acrylate, butyl acrylate and styrene which are copolymerizable with methyl acrylate. Examples of the styrene resin are polystyrene, a styrene-acrylonitrile copolymer, an $\alpha$-methylstyrene-acrylonitrile copolymer, a styrene-maleimide copolymer, a styrene-$\alpha$-methylstyrene-acrylonitrile copolymer, a styrene-$\alpha$-methylstyrene-maleimide-acrylonitrile copolymer, a styrene-maleic anhydride copolymer and the like. Examples of the carbonate resin are bisphenol polycarbonate, aliphatic polycarbonate and the like. Examples of the amide resin are nylon 6, nylon 6.6, nylon 12 and the like. Examples of the ester resin are poly(ethylene terephtharate), poly(butylene terephtharate) and the like. Examples of the olefin resin are polypropylene, polyethylene, cyclic polyolefin and the like.

It is preferable that the amount of the impact modifier of the present invention is usually 1 to 30 parts by weight based on 100 parts by weight of these thermoplastic resins. When the amount is less than 1 part by weight, there is a tendency that impact strength of the molded article is not improved. When the amount is more than 30 parts by weight, the molded article tends to be impractical because resistance strength for tensile is significantly lowered. The lower limit is 1 part by weight, and more preferably 3 parts by weight, while the upper limit of is 30 parts by weight, and more preferably 20 parts by weight.

The present invention is explained below by way of Examples in detail, but the present invention is not limited thereto.

In Examples "part" and "%" mean "part by weight" and "% by weight", respectively, unless otherwise noted.

EXAMPLE 1

There were mixed 200 parts of water and 4 parts of sodium oleate, and then the mixture was heated to 70° C. After the temperature of the mixture went up to 70° C., displacement was performed by using nitrogen. Then a mixture of 9 parts by weight of butyl acrylate, 1 part of acrylonitrile and 3 parts of t-dodecyl mercaptan was added thereto. After 30 minutes, 0.5 part (solid content) of 2% potassium persulfate aqueous solution was added thereto, and polymerization was conducted for an hour. Thereto was continuously added a mixture of 81 parts of butyl acrylate, 9 parts of acrylonitrile, 27 parts of t-dodecyl mercaptan over three hours. Post-polymerization was conducted for 2 hours to obtain a seed polymer latex (S-1) having an average particle size of 0.04 $\mu$m. After mixing 2 parts (solid content) of the seed polymer latex S-1 and 50 parts of water, thereto was added an emulsified solution in which a mixture comprising 98 parts of butyl acrylate, 0.3 part of allyl methacrylate, 0.75 part (solid content) of 5% sodium laurylsulfate aqueous solution and 400 parts of water was finely dispersed by using a homogenizer. The mixture was stirred for an hour at room temperature, and the particle size of the seed polymer was measured. The swelling volume ratio was 11 times according to the ratio of particle sizes before and after the addition of the emulsified solution of the monomers. Also, 5.00 g of a polymer in solid content was obtained by drying the seed polymer latex S-1 at 120° C. To the polymer was added 100 g of water and the mixture was stirred for an hour at room temperature. The seed polymer was first expanded by water and then dispersed into water in pieces. The dispersion solution was filtered using a paper filter and dried, and then water-soluble element (in this case sodium oleate) in the polymer dissolved by water entered into the polymer was measured. The extraction ratio of the dissolved water-soluble element was 90%.

There were mixed 2 parts (solid content) of the seed polymer latex S-1 and 50 parts of water, and then the mixture was heated to 50° C. After the temperature of the mixture went up to 50° C., displacement was performed by using nitrogen and 0.4 part (solid content) of 2% potassium persulfate aqueous solution was added thereto. To the mixture was continuously added, over six hours, an emulsified solution in which a mixture comprising 98 parts of butyl acrylate, 0.3 part of allyl methacrylate, 0.75 part (solid content) of 5% sodium laurylsulfate aqueous solution and 400 parts of water was finely dispersed by using a homogenizer. After that, post-polymerization was conducted for two hours to obtain a rubber latex R-1 containing water in particles, having average void ratio of 50% and particle size of 0.16 μm.

After 85 parts (solid content) of the rubber latex R-1 was heated to 45° C., thereto were added 0.15 part (solid content) of 5% sodium laurylsulfate aqueous solution, 0.0016 part of ferrous sulfate ($FeSO_4 \cdot 7H_2O$), 0.004 part of ethylenediaminetetraacetic acid.2 Na salt and 0.2 part of sodium formaldehyde sulfoxylate. To this was continuously added a mixture comprising 15 parts of methyl methacrylate and 0.01 part of cumene hydroperoxide over an hour, and post-polymerization was conducted for an hour to obtain a graft copolymer latex (G-1) having an average particle size of 0.19 μm.

This graft copolymer latex (G-1) was coagulated with calcium chloride, and subjected to thermal treatment, dehydration and drying, to obtain a hollow graft copolymer (A-1) in the form of powder.

To 100 parts of a vinyl chloride resin (available from Kaneka Corp., KANEVINYL S400) having a polymerization degree of 400 were mixed 9 parts of the hollow graft copolymer (A-1), 3.0 parts of octyl tin mercaptide, 1.0 part of stearyl alcohol, 0.5 part of stearic amide, 0.5 part of diol montanate, and 1.0 part of a processing aid (available from Kaneka Corp., PA10). The mixture was extruded by using a 50 mm single screw extruder (type VS50-26) made by Tanabe Plastic Machine K.K. under conditions of a rotational speed of 30 rpm, C1:140° C., C2:160° C., C3:160° C., C4:165° C. and D:160° C., to obtain a resin pellet. Then, the resin pellet was injection molded by using an injection molding machine IS-170G made by Mitsubishi Heavy Industries, Ltd. (C1: 150° C., C2: 160° C., C3: 170° C., nozzle: 175° C., mold temperature: 40° C.) to obtain a test piece for dumbbell and Izod test. Izod strength was measured according to JIS-K7110. Results are shown in Table 1.

EXAMPLE 2

Synthesis, coagulation, thermal treatment, formation of dry powder by dehydration, compounding, molding and evaluation were conducted in the same manners as in Example 1 except that the amounts of t-dodecyl mercaptan used for polymerizing the seed polymer were changed from 3 parts to 1 part, from 27 parts to 9 parts, respectively. Results are shown in Table 1.

EXAMPLE 3

Synthesis, coagulation, thermal treatment, formation of dry powder by dehydration, compounding, molding and evaluation were conducted in the same manners as in Example 1 except that the temperature for polymerizing the seed polymer was changed to 50° C. Results are shown in Table 1.

EXAMPLE 4

Synthesis, coagulation, thermal treatment, formation of dry powder by dehydration, compounding, molding and evaluation were conducted in the same manners as in Example 1 except that the composition of the seed polymer was changed such that the amount of butyl acrylate was 5 parts and the amount of styrene was 5 parts in the first polymerization and that the amount of butyl acrylate was 45 parts and the amount of styrene was 45 parts in the second polymerization. Results are shown in Table 1.

EXAMPLE 5

Synthesis, coagulation, thermal treatment, formation of dry powder by dehydration, compounding, molding and evaluation were conducted in the same manners as in Example 1 except that the composition of the seed polymer was changed such that the amount of styrene was 10 parts in the first polymerization and that the amount of styrene was 90 parts in the second polymerization. Results are shown in Table 1.

COMPARATIVE EXAMPLE 1

A mixture comprising 100 parts of butyl acrylate, 0.5 part of allyl methacrylate, 1.2 parts (solid content) of 5% sodium laurylsulfate aqueous solution and 450 parts of water was finely dispersed by using a homogenizer, and the mixture was stirred for an hour at room temperature. To the mixture were added 0.002 part of ferrous sulfate ($FeSO_4 \cdot 7H_2O$), 0.005 part of ethylenediaminetetraacetic acid.2 Na salt, 0.2 part of sodium formaldehyde sulfoxylate and 1.0 part of p-menthane hydroperoxide. Polymerization was conducted for 4 hours at 40° C. to obtain a rubber latex (R-2) having a void ratio of 0% and a particle size of 0.15 μm.

After 85 parts (solid content) of the rubber latex (R-2) was heated to 45° C., thereto were added 0.15 part (solid content) of 5% sodium laurylsulfate aqueous solution, 0.001 part of ferrous sulfate ($FeSO_4 \cdot 7H_2O$), 0.004 part of ethylenediaminetetraacetic acid.2 Na salt, and 0.2 part of sodium formaldehyde sulfoxylate. Thereto was continuously added a mixture of 15 parts of methyl methacrylate and 0.01 part of cumene hydroperoxide over an hour. Post-polymerization was conducted for an hour to obtain a usual graft copolymer latex (G-2) having an average particle size of 0.18 μm. Post treatment, molding and evaluation were conducted in the same manner as in Example 1. Results are shown in Table 1.

COMPARATIVE EXAMPLE 2

After mixing 200 parts of water and 4 parts of sodium oleate, 10 parts of butyl acrylate and 0.1 part of p-menthane hydroperoxide were added thereto, and the mixture was heated to 50° C. After the temperature of the mixture went up to 50° C., thereto were added 0.002 part of ferrous sulfate ($FeSO_4 \cdot 7H_2O$), 0.005 part of ethylenediaminetetraacetic acid.2 Na salt and 0.2 part of sodium formaldehyde sulfoxylate, and the polymerization was conducted for an hour. After that, a mixture of 90 parts of butyl acrylate and 0.9 part of p-menthane hydroperoxide was continuously added thereto over three hours. Post-polymerization was conducted for two hours to obtain a seed polymer latex (S-2) having an average particle size of 0.04 μm. Post treatment, molding and evaluation were conducted in the same manner as in Example 1 by using the seed polymer latex (S-2). Results are shown in Table 1.

of allyl methacrylate in the first polymerization, and that 27 parts of t-dodecyl mercaptan was changed to 0.45 part in the second polymerization.

TABLE 1

| | Polymerization of seed polymer | | | | Seed polymer | | Thermoplastic resin | |
|---|---|---|---|---|---|---|---|---|
| Composition | tDM (Part) | ALMA (Part) | Initiator | Polymerization temperature (° C.) | Swelling volume ratio (times) | Extraction ratio of water soluble element (%) | Void ratio of rubber (%) | Izod impact strength (f · kg · cm/cm$^2$) |
| Ex. No. | | | | | | | | |
| 1  BA/AN = 9/1 | 30 | 0 | KPS | 70 | 11 | 90 | 50 | 65 |
| 2  BA/AN = 9/1 | 10 | 0 | KPS | 70 | 5 | 40 | 20 | 42 |
| 3  BA/AN = 9/1 | 30 | 0 | KPS | 50 | 8 | 70 | 40 | 57 |
| 4  BA/ST = 5/5 | 30 | 0 | KPS | 70 | 10 | 80 | 45 | 61 |
| 5  ST | 30 | 0 | KPS | 70 | 5 | 30 | 10 | 25 |
| Com. Ex. No. | | | | | | | | |
| 1  — | — | — | — | — | — | — | 0 | 17 |
| 2  BA | 0 | 0 | PHO | 50 | 2 | 0 | 0 | 15 |
| 3  ST | 0 | 0 | PHO | 50 | 2 | 0 | 0 | 14 |
| 4  MMA | 0 | 0 | PHO | 50 | 2 | 0 | 0 | 13 |
| 5  BA/AN = 9/1 | 0 | 2 | KPS | 70 | 2 | 0 | 0 | 14 |

BA: butyl acrylate
AN: acrylonitrile
ST: styrene
MMA: methyl methacrylate
tDM: t-dodecyl mercaptan
ALMA: allyl methacrylate
KPS: potassium persulfate
PHO: p-menthane hydroperoxide

COMPARATIVE EXAMPLE 3

Synthesis, coagulation, thermal treatment, formation of dry powder by dehydration, compounding, molding and evaluation were conducted in the same manner as in Comparative Example 2 except that the butyl acrylate in Comparative Example 2 was changed to styrene in the composition of the seed polymer. Results are shown in Table 1.

COMPARATIVE EXAMPLE 4

Synthesis, coagulation, thermal treatment, formation of dry powder by dehydration, compounding, molding and evaluation were conducted in the same manner as in Comparative Example 2 except that the butyl acrylate in Comparative Example 2 was changed to methyl methacrylate in the composition of the seed polymer. Results are shown in Table 1.

COMPARATIVE EXAMPLE 5

Synthesis, coagulation, thermal treatment, formation of dry powder by dehydration, compounding, molding and evaluation were conducted in the same manner as in Example 1 except that 3 parts of t-dodecyl mercaptan used for polymerizing the seed polymer was changed to 0.05 part

INDUSTRIAL APPLICABILITY

The impact modifier comprising a rubber latex containing water in particles obtained by seed polymerization with seed polymers which are highly hydrophilic and sufficiently swellable into a rubber monomer shows an excellent improving effect on impact resistance for a thermoplastic resin.

What is claimed is:

1. A rubber latex, comprising:

water in particles, obtained by seed polymerization with seed polymers which are hydrophilic and swellable into a monomer for preparing rubber.

2. The rubber latex of claim 1, wherein 0.1 to 25 parts by weight of the seed polymer is used based on 100 parts by weight of the monomer for preparing rubber.

3. The rubber latex of claim 1, wherein an extraction ratio for a water-soluble substance to water is 10 to 100% after adding water to dry seed polymers in a twenty-fold amount and stirring for one hour, and wherein a swelling volume ratio, measured from the ratio of a latex particle size to an original particles size, is 3 to 20 times, said latex particle size being the value after adding a rubber latex to the seed polymer latex in an amount of 50 times the amount of seed polymer, and stirring for one hour.

4. The rubber latex of claim 3, wherein said extraction ratio is 50 to 100%, and said swelling volume is 5 to 15 times.

5. A process for preparing a rubber latex containing water in particles, which is obtained by seed polymerization with seed polymers which are hydrophilic and swellable into a rubber monomer for preparing rubber.

6. The process for preparing the rubber latex of claim 5, wherein the seed polymerization is performed by adding monomers continuously wherein an extraction ratio of a water-soluble substance to water is 10 to 100% after adding water to dry seed polymers in twenty-fold amount and stirring for one hour, and a swelling volume ratio, measured from the ratio of a latex particle size to an original particle size, is 3 to 20 times, said latex particle size being the value after adding a rubber latex to the seed polymer latex in an amount of 50 times the amount of seed polymer, and stirring for one hour.

7. The process for preparing the rubber latex of claim 6, wherein said extraction ratio is 50 to 100%, and said swelling volume is 5 to 15 times.

8. The process for preparing the rubber latex of claim 5, wherein the seed polymer is synthesized by emulsion polymerization with a water-soluble initiator.

9. An impact modifier for a thermoplastic resin, which is obtained by graft copolymerization with the rubber latex of claim 1.

* * * * *